Aug. 16, 1949.    L. W. ALVAREZ    2,479,195
COMMUNICATION SYSTEM

Filed April 7, 1945    3 Sheets-Sheet 1

*INVENTOR.*
LUIS W. ALVAREZ
BY
*William D. Hall.*
ATTORNEY

IVENTOR.
LUIS W. ALVAREZ
BY
William D. Hall
ATTORNEY

Aug. 16, 1949.                L. W. ALVAREZ                 2,479,195
                            COMMUNICATION SYSTEM
                                                          3 Sheets-Sheet 3
Filed April 7, 1945

INVENTOR.
LUIS W. ALVAREZ
BY
William D. Hall
ATTORNEY

Patented Aug. 16, 1949

2,479,195

UNITED STATES PATENT OFFICE 2,479,195

COMMUNICATION SYSTEM

Luis W. Alvarez, Berkeley, Calif., assignor, by mesne assignments, to the United States of America as represented by the Secretary of War Application April 7, 1945, Serial No. 587,190

6 Claims. (Cl. 343—112)

This invention relates to navigational aids and more particularly to a blind landing apparatus in which the pilot of an aircraft is provided with visual information regarding his position and flight relative to a predetermined course to a chosen landing point.

One object of this invention is to provide a system that will present on a single cathode ray tube screen all of the information necessary to guide a pilot in landing an aircraft.

Another object is to provide an indication, by means of a pattern on a cathode ray tube screen, of the distance of the aircraft from the desired landing point and the necessary correction which must be made to reach the predetermined course, as well as the flight direction of the aircraft.

Another object is to present on the indicator an artificial horizon which will disclose the angular position of the aircraft with respect to the true horizon and at the same time show the rate of climb or descent of the aircraft.

Another object is to indicate, by means of the separation between the aforementioned artificial horizon and said pattern and their positions on the cathode ray tube screen, whether or not the aircraft is pursuing a correct predetermined angle of glide path.

A further object is to furnish the pilot or operator of the aircraft with continuous quantitative data regarding his directional error from a given course, the correction he must make in flight to place the aircraft on the desired course, and his range from the desired landing point whereby he is enabled to direct the aircraft more smoothly and accurately to a landing.

Other objects and advantages of the invention will appear more fully from the disclosure herein.

Figs. 4 to 12, inclusive, show typical patterns on the oscilloscope screen for specific operating conditions.

Figure 1:
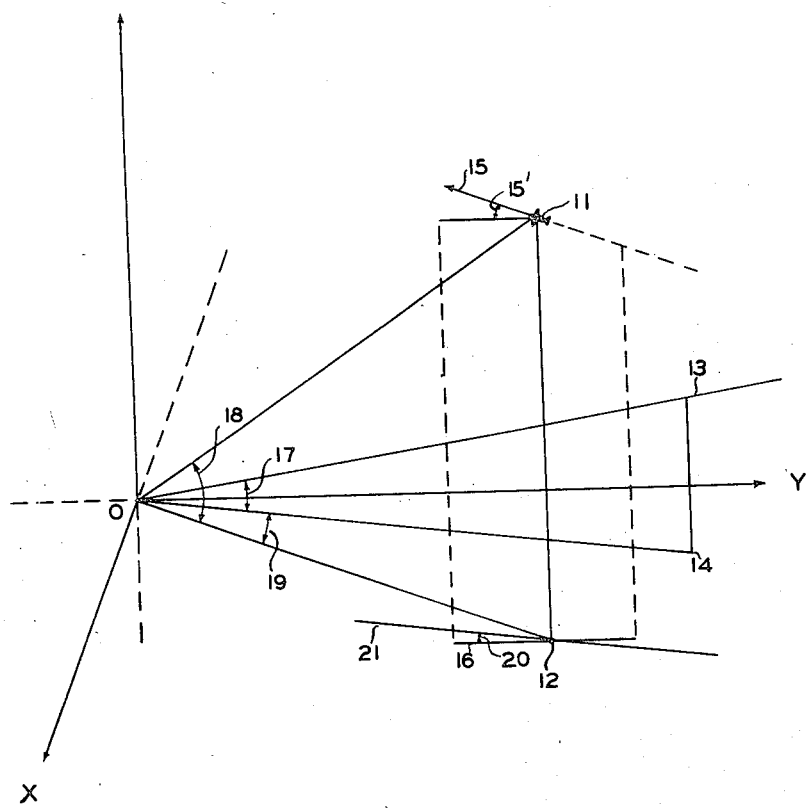
Fig. 1 is a schematic view involving a system of mutually perpendicular axes adapted to demonstrate the geometry here involved.

Referring now to Fig. 1, point 11 is the location of an object in flight, such as an aircraft. The term "aircraft" as used herein is intended to include any craft or vehicle in flight. X, Y and Z are mutually perpendicular axes in space. For convenience, point O, the origin of the axes, is chosen at the location to which it is desired to guide the aircraft. Line 13 is a predetermined path along which it is desired to guide the aircraft. The X-O-Y plane may be considered the horizontal reference plane, and directions perpendicular thereto, i. e., parallel to the Z axis, as the vertical.

Point 12 is the projection of point 11 on the horizontal reference plane. Line 14 is the projection of line 13 on the horizontal reference plane X—O—Y. Line 15 coincides with the direction of flight, or the direction of instantaneous motion, of the aircraft. Line 16 is the projection of line 15 on the horizontal reference plane.

The length of the line O—11 represents the range, that is, the distance of the aircraft from the point to which it is desired to direct it. Angle 18 between line O—11 and its projection on the horizontal reference plane, O—12, is the elevation of the aircraft. The length of line 11—12 represents the altitude of the aircraft. Angle 17, between line 13 and its projection 14 on the horizontal reference plane is the desired angle of glide path. Angle 18 minus angle 17, giving due regard to sign, is herein termed the vertical error angle, or vertical error. Angle 19 between the lines O—12 and O—14 is the horizontal error. Line 21 is drawn parallel to line 14 through point 12, and the angle 20 between the lines 16 and 21 is the heading error of the aircraft 11. The angle 15' between the line of flight 15 and the horizontal is the angle of climb (or descent, as the case may be) of the aircraft. This angle may be regarded as positive if the aircraft is ascending and negative if the aircraft is descending.

The angle of bank may be defined as the angle made with the horizontal by an element of the aircraft which, when the aircraft is in normal horizontal straight-line flight, is perpendicular to the direction of flight and parallel to the horizontal.

Figure 2:
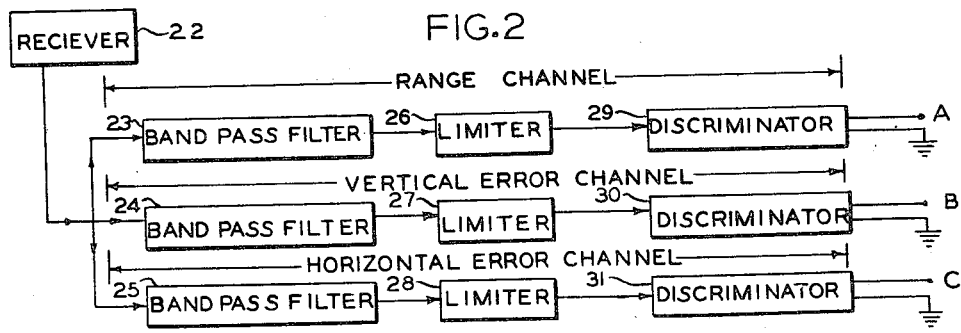
Fig. 2 is a block diagram showing a system for providing information regarding range from the desired landing point, and vertical and horizontal error from a predetermined course.

Referring now to Fig. 2, a receiver 22 responsive to frequency-modulated signals is provided for receiving radio energy from a ground station which includes a frequency-modulated transmitter or transmitter controlled by suitable radio object-locating equipment adapted to continuously furnish information regarding the position of the aircraft relative to the predetermined reference point or line, necessary corrections for parallax being incorporated in the data furnished. Equipment of this character is known in the art as automatic tracking apparatus and may readily be adapted to the purpose of this invention. In the present embodiment of the invention it is contemplated that the frequency of the carrier signal may be of the order of, say, 70 megacycles. Furthermore, it is desired to have three information channels corresponding respectively to range, vertical error, and horizontal error. Accordingly, the carrier wave may be modulated with several bands, such as 12, 14, and 16 kilocycles, respectively, each band comprising a signal of adjustable frequency which carries the information. As is customary in frequency-modulation systems, these channels may be separated by band-pass filters such as the filters 23, 24 and 25 which are respectively allocated to the frequencies applicable to range, vertical error and horizontal error. The outputs of the band-pass filters are then fed respectively to limiter stages 26, 27 and 28. In turn the outputs of these stages are fed to discriminator stages 29, 30 and 31. The output of the entire receiver system at points A, B, and C consists of direct-current voltages the values of which are dependent respectively on the information embodied in the incoming signals in the range, vertical error, and horizontal error channels.

The frequency of the signal in the range channel is so modulated by the ground station that the output at point A will be a direct-current voltage the magnitude of which depends on the range, but which is always of one polarity, say positive. The frequency modulation of the signal in the channel assigned to vertical error will be such that the output at point B will be a direct-current voltage dependent on the error and denoting by its polarity the sense of the error.

For example, if the aircraft is above the desired course the voltage at B will be positive, and for an error below the desired course, it will be negative. The same attribute of sense-polarity characterizes the voltage obtained at point C. When the aircraft is to the right of the desired course, the voltage at C, as noted by an observer in the aircraft, will be positive, and when to the left of the desired course, the voltage will be negative. The information transmitted by the ground station may be obtained by it by means of radio echo detection and range finding apparatus or other devices located on the ground.

Figure 3:
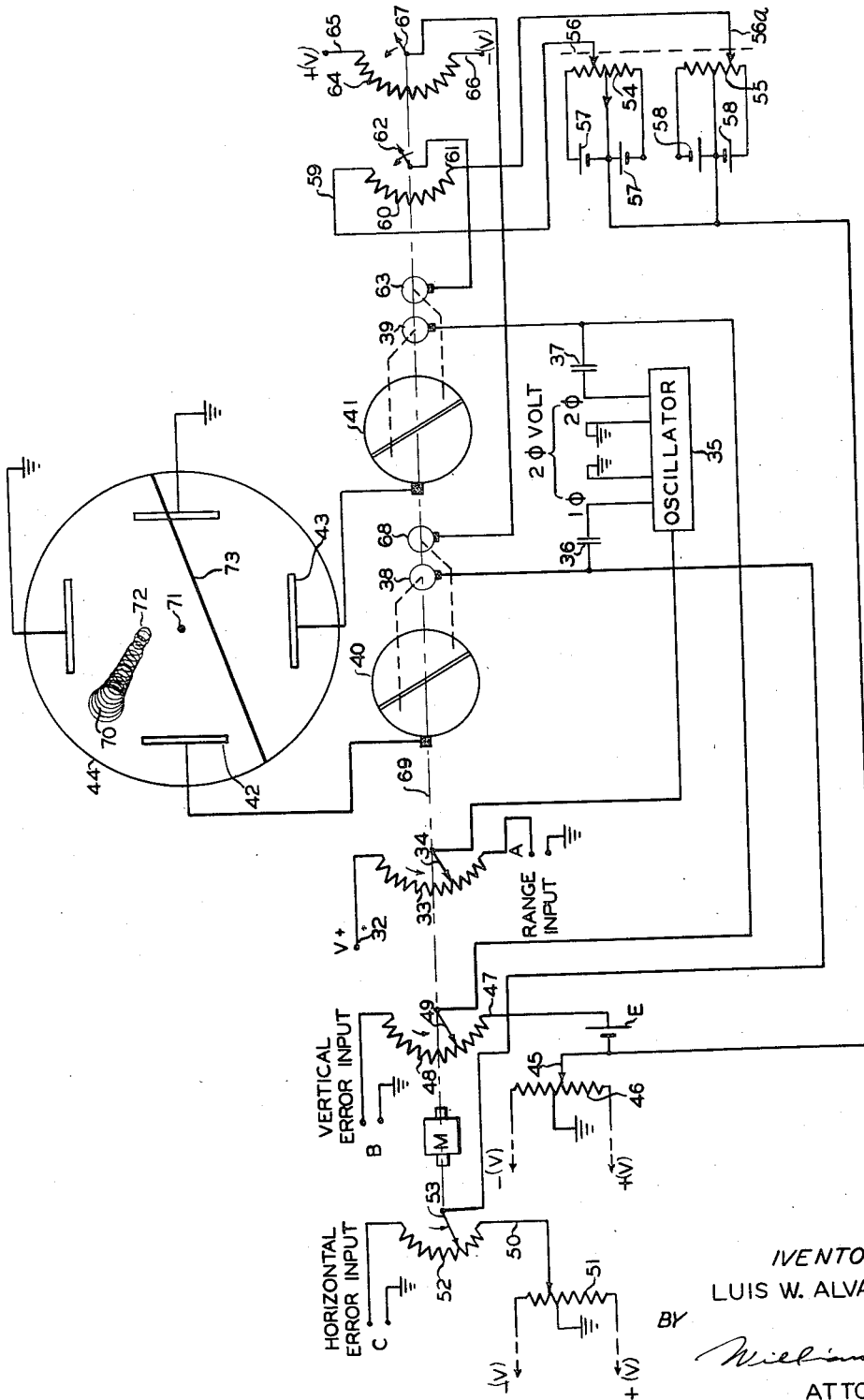
Fig. 3 is a circuit diagram showing one form of apparatus for accomplishing the objects of the invention.

Referring now to Fig. 3, the voltage from point A in Fig. 2 is applied to the terminal A of a potentiometer 33 in Fig. 3. At terminal 32 of the potentiometer there is applied a voltage having a constant value equal to the maximum voltage which may appear at A. Hence, there will be no voltage appearing across potentiometer 33 when the aircraft reaches the desired landing point. The voltage at terminal 32, then, corresponds to the voltage for minimum range which would appear at A. A voltage depending on the position of the contact arm 34 of potentiometer 33 is then carried to an oscillator 35. The function of the voltage picked up by arm 34 is to vary the amplitude of the output of oscillator 35. Oscillator 35 contains the necessary circuits to provide outputs through condensers 36 and 37 which are sinusoidal, of equal amplitude, and phased 90° apart. When such voltages are applied to the horizontal and vertical deflection plates 42 and 43 respectively, of the cathode ray tube 44, the electron beam will trace a circular sweep. The amplitude of the oscillator output is maximum for maximum voltage on arm 34. For lesser voltages, the amplitude of the output of oscillator 35 decreases.

Means are well known in the radio art for devising circuits which will produce circular sweep traces on a cathode ray tube. Means also are well known for causing the amplitude of the output of oscillator 35 to be responsive to the voltage on the contact arm 34 of potentiometer 33.

The output of oscillator 35 is communicated through condensers 36 and 37 to slip-rings 38 and 39 respectively, and then through commutators 40 and 41 respectively to horizontal and vertical plates 42 and 43 of cathode ray tube 44.

Any two mutually perpendicular axes of a cathode ray tube having means for deflecting an electron beam along each axis respectively are considered herein as constituting a horizontal axis and a vertical axis for purposes of convenient reference and distinction. It is understood that the terms are not restricted to axes which are necessarily horizontal and vertical with respect to the horizontal reference plane since it is obvious that the tube itself may change orientation by rotation, or, if electromagnetic deflecting means are used, that the coils thereof may be rotated.

Cathode ray tube 44 may be connected according to any of the standard circuits for oscilloscopes. However, as no unique features of the invention are directed to the oscilloscope circuit, to the means for varying the amplitude of the oscillator output, nor to means for obtaining the desired phase relations and equality of amplitude of the voltages fed through condensers 36 and 37, such details are omitted for the sake of simplicity. Furthermore, many possible variations and combinations of these means are well known to the art.

The voltage from point B, Fig. 2, is applied at the terminal B of a potentiometer 48, Fig. 3. The contact arm 45 of a potentiometer 46 picks up a voltage the value of which depends on the rate of climb or descent of the aircraft. Means for obtaining such a voltage may include a potentiometer whose arm is actuated in accordance with the relative position of the plane by means of the plane's climb-descent gyroscope, or by a Selsyn similarly actuated and connected through a rectifier. Therefore, the voltage at contact 45 will be a direct-current voltage proportional to the angle of climb or descent of the plane, and of positive polarity if the plane is climbing, and of negative polarity if the plane is descending. Between the contact 45 and a terminal 47 of potentiometer 48 is inserted a source of potential E to be adjusted in such manner that the potential at point 47 will be more positive than the potential at point 45 by an amount corresponding to a desired angle of glide path. This fixed voltage may be chosen as zero, of course, the pilot then depending on other indications, for the correct rate of descent. Although shown as a fixed voltage, it is apparent that this voltage might be variable so that the operator could choose any desired value. A similar result could be obtained by displacement of contact 45 from its neutral position when the airplane is in level flight. The voltage at B is positive if the plane is above the predetermined desired path, and negative if it is below this path, and is proportional to the magnitude of the error. A voltage from potentiometer 48 picked up by potentiometer arm 49, the value of this voltage being dependent upon the position of the arm 49, is applied directly to slip-ring 39 and thence by commutator 41 to the vertical deflection plate 43 of the cathode ray tube 44. A terminal C of potentiometer 52, Fig. 3, is applied the voltage from point C of Fig. 2. The voltage at terminal 50 of this potentiometer is made to depend on the heading of the plane from a predetermined direction in a horizontal plane. It will be negative if the plane is pointed to the left of the desired direction, and positive if the plane is pointed to the right of the desired direction. Means for obtaining such a direct-current voltage may include a potentiometer 51 arranged to operate in accordance with the relative position of the plane and its directional gyroscope, in the same manner as the voltage proportional to the rate of climb or descent of the plane is obtained. A voltage is picked up by contact arm 53 of potentiometer 52 having a value depending on the position of this arm and is applied to slip-ring 38 and thence through commutator 40 to the horizontal deflection plate 42 of cathode ray tube 44. A voltage proportional to the rate of climb or descent of the plane, which may be the same as the voltage at point 45, is applied in parallel to the center taps of two potentiometers 54 and 55. These potentiometers are tangent-wound; for example, potentiometer 54 is so wound that for a given displacement of its contact arm 56 on either side of its position of rest (the center tap of potentiometer 54) the resistance from the center tap to the arm 56 will bear a ratio to the total resistance from center tap on that side, of tan $\theta$, where $\theta$ is a linear function of the motion of the arm 56.

In regard to potentiometer 54, its extreme terminals are supplied with equal voltages of opposite polarity above and below a fixed value from the center tap voltage, by means such as the batteries 57. The positions of the sliding contact arms 56 and 56a are determined by the degree of bank of the plane, their displacements being linear with the angle of bank. This may be accomplished by having their positions determined by the relative angle between the plane and its bank gyroscope. Potentiometer 55 resembles potentiometer 54 in that it has similar direct-current voltages applied to its extremes, using batteries 58, and operates similarly, except that the motion of its arm 57 is toward the extreme having the negative voltage applied when arm 56 is moving toward the extreme having the positive voltage applied, and vice versa.

The voltage from arm 56 is applied to one terminal 59 of a potentiometer 60, and the voltage from arm 56a is applied to the other terminal of potentiometer 60. Potentiometer arm 62 thus picks up a voltage, the value of which depends on the position of this arm, which is applied through slip-ring 63, thence through commutator 41 to the vertical deflection plate 43 of oscilloscope 44. From an examination of the circuit involving potentiometers 54 and 55 and potentiometer 60, it will be seen that if arm 62 moves from terminal 59 to terminal 61 of potentiometer 60 at a uniform velocity, the voltage on deflection plate 43 will vary linearly with time from a value proportional to tan $\theta$ plus the magnitude of the voltage applied at 45 to a value proportional to negative tan $\theta$ plus the magnitude of the voltage applied at 45.

Potentiometer 64 has for its purpose to provide a linear sweep voltage for the artificial horizon line, and accordingly there are applied at its terminals 65 and 66 arbitrary positive and negative voltage values, respectviely, to give the desired sweep amplitude. Contact arm 67 of potentiometer 64 picks up voltages which may vary depending on its position and applies them through slip-ring 68 and commutator 40 to horizontal deflection plate 42.

In the present embodiment of the invention the various potentiometers 52, 48, 33, 60 and 64 have arcuately shaped resistors and rotatable wiping contacts or arms cooperating therewith. A shaft 69 is mechanically geared to the potentiometer arms 53, 49, 34, 62 and 67, and also to the commutator and slip-rings 40, 38, 68, 41, 34 and 63. The shaft may be rotated by a constant speed motor M.

The arrangement is such that contact arms 53, 49 and 34 engage their respective potentiometer windings at substantially the same time as contact arms 62 and 67 are disengaged from their respective potentiometer windings. While arms 53, 49 and 34 are making contact, the voltages from slip-rings 38 and 39 are being applied to the cathode ray tube deflection plates. When arms 53, 49 and 34 are out of contact with their resistors, the voltages from the potentiometer arms 62 and 67 are applied to the cathode ray tube deflection plates.

In order to facilitate an understanding of the invention a brief explanation of its operation follows:

The voltage on arm 34 controls the amplitude of the output of the oscillator 35. Assuming a cycle to begin at the time arms 53, 49 and 34 make contact with their resistors, the oscillator 35 then produces a maximum-size circle such as indicated at 70, Fig. 3, traced on the cathode ray tube screen. The center of this maximum-sized circle will be vertically displaced from the normal center of the electron beam, point 71, Fig. 3, by a distance proportional to the voltage produced at point B in the circuit diagram and therefore proportional to the vertical error of the plane from a predetermined path. Likewise the horizontal displacement of the center of the maximum-sized circle 70 is proportional to the horizontal error of the plane from a predetermined path. Because of variations in the amplitudes of the voltages applied to the deflecting plates 42 and 43, due to the action of the rotating potentiometer arms 53, 49 and 34, a series of circles commencing with the circle 70 is traced on the viewing screen during the first half-cycle. Since the angular motion of the shaft 69 is linear with time, and potentiometers 52, 48 and 33 are linearly wound, the circles are reduced in diameter linearly with time to a minimum amplitude dependent on range. Moreover, the centers of the circles describe a linear path on the screen and the center of the minimum-sized circle 72 is displaced vertically by a distance proportional to the angle of climb less the desired angle of glide path, and horizontally by a distance proportional to the heading error from the desired direction horizontally. Obviously, in this example of the invention, the actual path traced by the electron beam on the cathode ray tube screen does not consist of a series of discrete circles, but rather of a spiral. However, by causing the frequency of oscillator 35 to be large compared to the frequency of rotation of shaft 69, the figure traced on the screen may be considered with sufficient accuracy as composed of numerous circular traces. At the completion of a half-cycle of operation, the commutators 40 and 41 switch the deflecting plates 42 and 43 to the potentiometer arms 67 and 62 and there is now traced on the screen a straight line 73 whose angle with the horizontal axis of the screen is proportional to the true angle with the horizontal at which the plane is banked. Obviously, by appropriate choice of voltages or amplifiers the two angles may be made equal. Further, the vertical displacement of the line from the center of the screen is proportional to the angle of climb or descent. This completes one cycle of operation and as the shaft continues its rotation, commutating action again takes place, arms 53, 49 and 34 again make contact with their resistors and the circular traces are again swept on the screen. The combined action of these operations at a proper rate, with correct screen persistency, will produce a figure such as that shown in Fig. 4.

Figure 4:
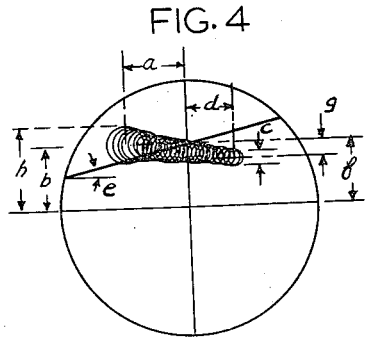

Fig. 4 illustrates the appearance of the cathode ray tube screen when a typical pattern is traced on the screen. The distance $a$, which is the displacement of the center of the maximum-size circle from the vertical axis of the cathode ray tube screen, indicates the horizontal error of the aircraft from a predetermined course. Likewise $b$, the distance of the center of the maximum-size circle from the horizontal axis of the cathode ray tube screen represents the vertical error from a predetermined course. $c$ is the diameter of the minimum-size circle, and this diameter indicates the relative distance of the aircraft from the desired landing point. $d$ is the distance of the center of the minimum-size circle from the vertical axis of the cathode ray tube screen. This distance indicates the azimuth angle at which the aircraft is heading away from the desired direction of travel on the desired course, on the heading error, so that if the distance $d$ is to the right of the vertical tube axis the aircraft is headed to the left of the desired direction, and if $d$ is to the left of the axis the aircraft is headed to the right of the desired direction. Of course, if $d$ is zero, the aircraft is headed horizontally in a direction parallel to the desired landing path.

The angle $e$, the angle of the line which is the artificial horizon with the horizontal axis of the cathode ray tube screen, is equal to the angle of bank of the aircraft from the horizontal. The distance $f$ of the center of the artificial horizon line from the horizontal axis of the cathode ray tube screen indicates the angle at which the plane is climbing or descending, or its rate of climb or descent. When the distance $f$ is above the horizontal axis of the cathode ray tube screen the plane is descending, and when it is below the horizontal axis the plane is ascending. The distance $g$ of the center of the minimum-sized circular trace below the center of the artificial horizon line indicates the desired angle of glide path as set by the operator or pilot.

Figure 5:
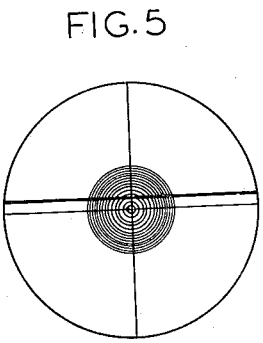

Referring now to Fig. 5, there is shown a representative pattern such as would appear on the cathode ray tube screen with the plane level, headed towards the desired landing point on the predetermined course and at the correct angle of glide path.

Figure 6:
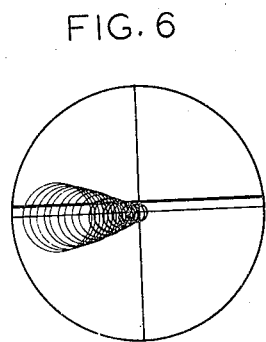

Fig. 6 illustrates the appearance of the cathode ray tube screen with the aircraft at the right of the predetermined course, but heading parallel to the desired course in azimuth, and descending at approximately the predetermined angle of glide path.

Figure 7:
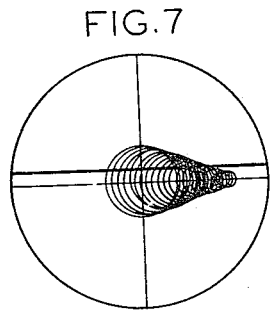

Fig. 7 shows the appearance of the cathode ray tube screen with the aircraft at a point on the desired predetermined course, but heading to the left of the desired direction and descending at about the desired angle of glide path.

Figure 8:
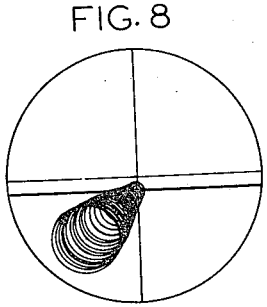

Fig. 8 indicates the appearance of the cathode ray tube screen with the aircraft level (not banked) above and to the right of the predetermined course, but heading horizontally parallel to the predetermined landing path and with approximately the correct angle of glide path.

Figure 9:
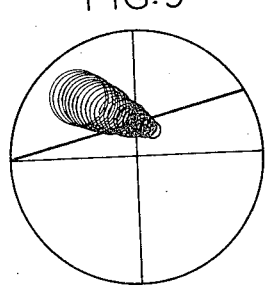

Fig. 9 shows the cathode ray tube screen with the aircraft banked to the right and positioned below and to the right of the predetermined course, headed to the left of the desired direction, and descending at an angle greater than the desired angle of glide path.

Figure 10:
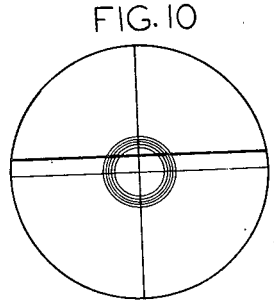

Fig. 10 shows the appearance of the cathode ray tube screen with the aircraft in level flight headed toward the desired landing point on the predetermined course at the desired angle of glide path, and with the distance from the desired landing point shown as considerably decreased from that indicated in the preceding six figures.

Figure 11:
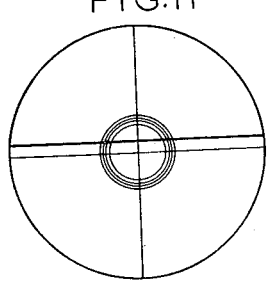

Fig. 11 shows the appearance of the cathode ray tube screen under the same conditions as Fig. 9, but with the distance to the desired landing point still further decreased.

Figure 12:
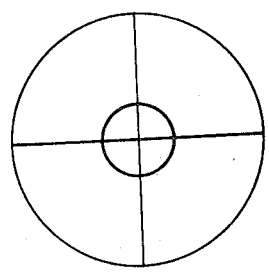

Fig. 12 shows the appearance of the cathode ray tube screen at the time of landing.

The figure on the cathode ray tube screen is therefore a composite pattern consisting of the artificial horizon and the multiple circular traces. The latter give the illusion of a funnel, such that if the pilot directs his aircraft into the larger end of the illusory funnel and thence down its axis, the plane will automatically be guided to a correct landing at the desired landing point. The illusion of going down the funnel and approaching its small end, finally results in a series of patterns such as those shown in Figs. 10, 11, and 12 as the plane makes the desired landing.

It is apparent to one skilled in the art to which this invention pertains that there are many equivalents for the various means used in the illustrated embodiment of the invention. For instance, push-pull amplification might be used on the electrostatic deflection plates of the cathode ray tube, or magnetic deflection of the electron beam might be employed. Electronic means might be employed in place of the potentiometers 1, 13, 20, 28 and 32 for obtaining the variations in the voltages. Electronic means could be used to accomplish commutation, or high-frequency electronic switching could be used. Many other variations and equivalents in the circuits could be improvised without departing from the teachings of the present disclosure. Therefore, it is not desired to restrict the application to the particular form of the invention as set forth above.

What is claimed is:

1. In a navigational system for directing an aircraft along a predetermined path to a predetermined point, means for establishing a reference voltage corresponding in value to a selected minimum range of said aircraft relative to said predetermined point, means for producing a second voltage proportional to the vertical error in the position of said aircraft with reference to said predetermined path, means for producing a third voltage proportional to the horizontal error in the position of said aircraft with reference to said predetermined path, a cathode ray tube having means for deflecting its electron beam along horizontal and vertical axes of said tube, means effective upon said deflecting means for causing said electron beam to trace a first circle, the diameter of which is a function of said reference voltage, means effective upon said electron beam deflecting means for causing said first circle to be displaced along the vertical axis of said tube an amount proportional to said second voltage, means effective upon said electron beam deflecting means for causing said first circle to be displaced along the horizontal axis of said tube an amount proportional to said third voltage, means for producing a fourth voltage corresponding in value to the then existing range of the aircraft relative to said predetermined point such that the voltage which is set up when said minimum range is attained by said aircraft shall equal said reference voltage, means for producing a fifth voltage proportional to the heading error in the direction of flight of said aircraft relative to said predetermined path, means for producing a sixth voltage proportional to the algebraic sum of the angle of climb of said aircraft and the angle of said predetermined path with the horizontal, means effective upon said deflecting means for causing said electron beam to trace a second circle the diameter of which is a function of said fourth voltage, means effective upon said electron beam deflecting means for causing said second circle to be displaced along the horizontal axis of said tube an amount proportional to said fifth voltage, means effective upon said electron beam deflecting means for causing said second circle to be displaced along the vertical axis of said tube an amount proportional to said sixth voltage, and cyclically operating means to effect alternate operation of said means for causing said first circle to be traced and said means for causing said second circle to be traced.

2. In a system as set forth in claim 1, means for providing a seventh voltage having a variable magnitude proportional to the tangent of the angle of bank of said aircraft in flight, and means effective upon said deflecting means for causing said electron beam to trace a straight line such that the tangent of the angle which said line makes with the horizontal axis of said tube is proportional to said seventh voltage and such that the displacement of said line along the vertical axis of said tube is proportional to that component of said sixth voltage representing the angle of climb of said aircraft, said means for causing said line to be traced being arranged to operate under control of said cyclically operating means in sequence with the operations of the other said means controlled thereby.

3. In a navigational system for directing an aircraft along a predetermined path to a predetermined point, a cathode ray tube having means for deflecting its electron beam along the horizontal and vertical axes of said cathode ray tube, means for substantially continuous determination of data consisting of the horizontal error, the vertical error, the range, the heading error, and the angle of climb of said aircraft in its flight relative to said point and said path, means for establishing voltages respectively as functions of the values of said data, and means effective upon said deflecting means and controlled by said voltage-establishing means for causing the electron beam of said cathode ray tube to trace a series of circles graduated in size such that the diameter of the maximum-sized circle of said series is a function of a predetermined minimum value of the range, the displacements of the maximum-sized circle along the horizontal and vertical axes are functionally related to the horizontal and vertical errors respectively, the diameter of the minimum-sized circle of said series is a function of the actual range, the horizontal displacement of the minimum-sized circle is a function of the heading error, and the vertical displacement of the minimum-sized circle is functionally related to the algebraic sum of the angle of climb and the angle of said path with the horizontal.

4. In a system as set forth in claim 3, means for substantially continuous determination of the angle of bank of said aircraft in flight, means for establishing a voltage as a function of said angle of bank, means effective upon said deflecting means and controlled by said last-mentioned voltage-establishing means for causing said electron beam to trace a straight line such that said line makes an angle with the horizontal axis of said tube proportional to said angle of bank and such that the displacement of said line along the vertical axis of said tube is a function of the angle of climb of said aircraft, and means enabling said means for effecting circle-tracing and said means for effecting line-tracing to operate in alternation.

5. A method of directing an aircraft along a predetermined glide path to a predetermined point, comprising the steps of substantially continuously determining navigational data consisting of the horizontal error, the vertical error, the range, the heading error and the angle of climb of said aircraft in its instantaneous position and direction of flight relative to said path and said point, establishing voltages the respective values of which are functionally related to said data, establishing other voltages the respective values of which are functionally related to a predetermined minimum range and a predetermined glide path angle, applying said horizontal error voltage, vertical error voltage and minimum range voltage to the deflecting elements of a cathode ray tube carried by said aircraft for causing the electron beam of said tube to trace a first circle the diameter of which is dependent upon said minimum range voltage and the horizontal and vertical displacements of which are respectively proportional to said horizontal and vertical error voltages, applying said range and heading error voltages and the algebraic sum of said climb angle voltage and said glide path voltage to said deflecting elements for causing said electron beam to trace a second circle the diameter of which is dependent upon said range voltage and the horizontal and vertical displacements of which are respectively proportional to said heading error voltage and said algebraic sum voltage.

6. A method as set forth in claim 5, including the additional steps of establishing a voltage which is a function of the angle of bank of said aircraft in flight, and applying said bank angle voltage and said climb angle voltage to the deflecting elements of said tube for causing the electron beam to trace a straight line having an angle with the horizontal indicative of said angle of bank, the vertical displacement of said line being proportional to said climb angle.

LUIS W. ALVAREZ.

REFERENCES CITED

The following references are of record in the file of this patent:

UNITED STATES PATENTS

| Number | Name | Date |
|---|---|---|
| 2,262,033 | Moseley | Nov. 11, 1941 |
| 2,262,245 | Moseley et al. | Nov. 11, 1941 |